US006857389B2

(12) United States Patent
Miller

(10) Patent No.: US 6,857,389 B2
(45) Date of Patent: Feb. 22, 2005

(54) TEAT CUP SYSTEM

(75) Inventor: Steven J. Miller, Hyrum, UT (US)

(73) Assignee: Silicone Plastics, Inc., Millville, UT (US)

( * ) Notice: Subject to any disclaimer, the term of this patent is extended or adjusted under 35 U.S.C. 154(b) by 0 days.

(21) Appl. No.: 10/601,344

(22) Filed: Jun. 20, 2003

(65) Prior Publication Data

US 2004/0050334 A1 Mar. 18, 2004

Related U.S. Application Data

(60) Provisional application No. 60/390,582, filed on Jun. 21, 2002.

(51) Int. Cl.$^7$ .................................................. A01J 5/04
(52) U.S. Cl. .................................................. 119/14.49
(58) Field of Search ........................... 119/14.49, 14.51, 119/14.53, 14.48, 14.47

(56) References Cited

U.S. PATENT DOCUMENTS

| 1,167,968 | A | 1/1916 | Anderson |
| 101,945 | A | 11/1916 | Treloars |
| 1,312,941 | A | 8/1917 | Anderson |
| 1,365,665 | A | 1/1921 | Davies |
| 331,297 | A | 7/1930 | Ridd |
| 2,502,362 | A | 3/1950 | Babson et al. |
| 2,621,626 | A | 12/1952 | Harris et al. |
| 2,997,980 | A | 8/1961 | Noorlander |
| 3,659,558 | A | 5/1972 | Noorlander |
| 3,661,120 | A | 5/1972 | Siddall et al. |
| 3,696,790 | A | 10/1972 | Albright |
| 3,845,743 | A | 11/1974 | Van Staveren |
| 3,973,521 | A | 8/1976 | Duncan |
| 4,269,143 | A | 5/1981 | Erbach |
| 4,280,446 | A | 7/1981 | Noorlander |
| 4,315,480 | A | 2/1982 | Noorlander |
| 4,441,454 | A | 4/1984 | Happel et al. |
| 4,459,938 | A | 7/1984 | Noorlander |
| 4,483,272 | A | 11/1984 | Tonelli |
| 4,648,350 | A | 3/1987 | Noorlander |
| 4,651,676 | A | * 3/1987 | Kupres ..................... 119/14.47 |
| 4,941,433 | A | 7/1990 | Hanauer |
| 4,964,368 | A | * 10/1990 | Ball et al. ................. 119/14.49 |
| 5,178,095 | A | 1/1993 | Mein |
| 5,224,442 | A | 7/1993 | Davies |
| 5,386,799 | A | 2/1995 | Dietrich |
| 5,482,004 | A | 1/1996 | Chowdhury |
| 5,666,904 | A | 9/1997 | Grindal |
| 5,809,932 | A | 9/1998 | van den Berg |
| 6,039,001 | A | * 3/2000 | Sanford .................... 119/14.47 |
| 6,164,243 | A | 12/2000 | Larson |
| 6,202,593 | B1 | 3/2001 | Maier et al. |
| 6,308,656 | B1 | 10/2001 | Milbrath et al. |
| 6,631,694 | B1 | * 10/2003 | Chowdhury ............. 119/14.46 |

FOREIGN PATENT DOCUMENTS

| FR | 1113916 | 4/1956 | |
| GB | 101945 | 11/1916 | |
| GB | 331297 | 7/1930 | |
| GB | 2186780 A | * 8/1987 | ............. A01J/5/00 |

* cited by examiner

Primary Examiner—Son T. Nguyen
(74) Attorney, Agent, or Firm—Thorpe North & Western

(57) ABSTRACT

A teat cup system including a tubular sleeve, a milk receiving cup having a portion configured to be operatively coupled to a lower end portion of the tubular sleeve, and a liner member including a head portion and a tubular elongate inflation portion and wherein the tubular elongate inflation portion is configured to be inserted through the tubular sleeve so that the head portion of the liner is disposed around an upper end portion of the tubular sleeve and the elongate inflation portion disposed within the tubular sleeve, and a bottom end of the tubular elongate inflation portion invertedly drawn around a lower end portion of the tubular sleeve, a portion of the milk receiving cup capturing the inverted free end between the lower end portion with an interference fit.

21 Claims, 5 Drawing Sheets

TEAT CUP SYSTEM

Priority of U.S. Provisional Patent Application No. 60/390,582 filed on Jun. 21, 2002 in the US Patent Office is hereby claimed.

BACKGROUND OF THE INVENTION

The present invention relates generally to teat cup assemblies for vacuum-operated automatic milking machines for milking dairy cows. More particularly, the invention relates to an improved teat cup configured for manufacturability and long service life.

Conventional automatic milking machines have been known for many decades. Such machines typically utilize teat cup assemblies for withdrawing milk through each of the cow's teats during milking. A typical teat cup includes a hollow, rigid outer shell or sleeve having a port which is adapted to be attached to a pulsating vacuum line. A resilient, tubular liner or inflation typically extends from a top to a bottom of the sleeve, concentrically disposed within the shell. The ends of the inflation make sealing engagement with the shell to form an annular vacuum chamber between the shell and the inflation. The pressure in the annular chamber is alternated between a lower pressure, typically a sub-atmospheric pressure, and a higher pressure, typically atmospheric, by the pulsating vacuum line attached to the shell at the port. A milk-collecting vacuum line is connected to a milk-receiving cup attached to the shell and in communication with the interior of the inflation, positioned at the lower end of the inflation. This line is to draw milk from the cow's teat and convey it to a collection tank, typically. A cow's teat is received through an upper end of the inflation. The interior of the inflation is, thus, maintained at a sub-atmospheric pressure, and the alternating pressure in the annular chamber periodically forces the walls of the inflation outwardly and inwardly resulting in a massaging action on the teat as well as periodically collapsing the walls of the inflation below the teat. The collapse of the inflation periodically relieves the teat from exposure to the vacuum within the inflation due to the negative pressure in the milk-collecting vacuum line. The teat cup is made heavy enough that it draws the teat downward, and the combination of the effects of the weight of the teat cup and the variation of geometry of the inflation and variation of the amount of vacuum to which the teat is exposed, causes the inflation to ride up and down on the teat by a small amount. All these together help to cause the milk let-down response and improved milk production during milking of the animal.

Inflations are typically composed of elastomeric, resilient, materials due to the need for an inflation to have the properties of such materials, i.e., their capability of recovering to their original size and shape after repeated deformation. Inflations are most often made from a natural rubber or a synthetic rubber composition, e.g. a silicone rubber material. Each of these classes of materials has their own unique advantages and disadvantages. For example, natural rubber compositions are more resistant to tearing or ripping, but are subject to attack by oils, butterfats, teat treatment preparations and other chemicals used in the milking process. On the other hand, synthetic rubber materials such as silicone rubbers can be made substantially less vulnerable to attack by such chemicals. However, silicone rubber tends to crack, tear and puncture more easily than natural rubber. Therefore the configuration of the inflation liner is important to mitigate these service life problems in synthetic rubber materials such as silicone.

It is important that an upper portion of the inflation and/or teat cup as a whole grips the teat firmly to prevent vacuum loss and disengagement of the teat cup from the teat, as well as to prevent the teat cup from moving higher up on the teat during milking due to the up and down motion of the teat cup due to the pulsations of the milking machine. If the teat cup rides up too high, this can ultimately result in constriction of the teat and premature shut off of milk from the udder, even though the udder is not emptied. Moreover, the teats of different cows vary considerably in their diameter and length. Changes in teat sizes also occur during the milking process. These variations and changes make it a challenge to produce "one size fits all" teat cups which can be used in milking a number of different cows. The design of teat cups has generally been toward more complex configurations to maximize advantages and minimize disadvantages in providing the functionality just described.

One approach to a teat cup assembly includes a sphincter-like diaphragm at the upper portion of the assembly which is a separate element made from a molded elastomeric material. Such a diaphragm defines a central opening which maintains sufficient contact with the teat of the cow so as to prevent the teat cup from dropping off the teat, but still sufficiently flexible to be used on teats of various sizes while resisting riding up too high, for example to improve milking efficiency and reduce tissue damage and mastitis, etc. Although the diaphragm provides considerable advantages, the configuration typically requires additional structure to implement. For example one approach is to provide an upper collar and protective cap to sandwich the diaphragm there between This is in turn coupled to an upper portion of the shell, with the inflation disposed within the shell. An example of such a configuration is disclosed in U.S. Pat. No. 4,315,480 to Noorlander.

The additional components of the Noorlander teat cup assembly, as an example of the type, can add to the overall cost. Further, additional components generally translates to greater potential for error in manufacturing; which in can result in greater potential for a failure which can limit the service life of the teat cup.

SUMMARY OF THE INVENTION

It has been recognized that it would be advantageous to develop a teat cup assembly that maintains the advantages alluded to above, but which involves a simplified configuration and method of assembly, reducing the number of components in the teat cup reducing the cost of the teat cup assembly. The invention provides a teat cup system which essentially includes a tubular sleeve, a milk receiving cup and an inflation liner member. The liner member includes a head portion and a tubular elongate inflation portion. The head portion includes an upper teat chamber defined by an upper diaphragm, a cylindrical wall, and an intermediate wall extending inwardly from the cylindrical wall. The upper diaphragm provides an upper wall extending inward from the cylindrical wall and defining a central opening which can be expanded by deformation of the upper wall defining the opening. The cylindrical wall of the head portion is positioned adjacent a cylindrical retaining extension configured to cooperate with an upper end portion of the tubular sleeve to hold the liner in the sleeve. The tubular elongate inflation portion includes a tubular portion with opposite first and second ends defining a liner bore longitudinally along a length of the tubular elongate inflation portion and has opposite first and second open ends. The first end is integrally interconnected and extends from the intermediate wall of the head portion. The first open end opens into the upper teat chamber. The second end of the tubular elongate inflation portion is an initially free end configured to be captured and held adjacent a bottom portion of the sleeve. With this arrangement, the tubular elongate inflation portion is configured to be inserted through a sleeve bore defined in the tubular sleeve so that the cylindrical retaining extension wall of the head portion is disposed around an upper end portion of the tubular sleeve. The inflation portion is configured to be placed in tension with the initially free end of the tubular elongate portion invertedly drawn outwardly and around a lower end portion of the tubular sleeve. At least a portion of the milk receiving cup is configured to cooperate with the sleeve and liner member to capture the now inverted and stretched free end between the lower end portion of the tubular sleeve and the milk receiving cup. The milk receiving cup can be attached to the sleeve by means of an interference fit.

In another aspect, the invention includes a method of making a teat cup configured to draw milk from a teat of a cow in association with a vacuum pump of a milking machine providing cyclic suction thereto, the method comprising: (a) inserting a tubular elongate inflation liner, defining a liner bore along a length thereof, into a tubular sleeve so that an upper end portion of the tubular sleeve is disposed within a retaining portion of a head member, the head member integrally interconnected and extending to one end of the tubular elongate inflation portion so that the liner bore extends into an upper teat chamber defined in the head member; (b) pulling a free end of the tubular elongate inflation liner, disposed in the tubular sleeve, to place tension on the inflation liner and invertedly draw the free end around a lower end portion of the tubular sleeve while simultaneously abutting the upper end portion of the tubular sleeve against the retaining portion of the head member with the tension placed on the tubular elongate inflation portion; and (c) longitudinally sliding a milk receiving cup over the inverted free end of the liner to capture the inverted free end against the lower end portion of the tubular sleeve with an interference fit.

Additional features and advantages of the invention will be apparent from the detailed description which follows, taken in conjunction with the accompanying drawings, which together illustrate, by way of example, an implementation of the invention.

DETAILED DESCRIPTION

Figure 1:
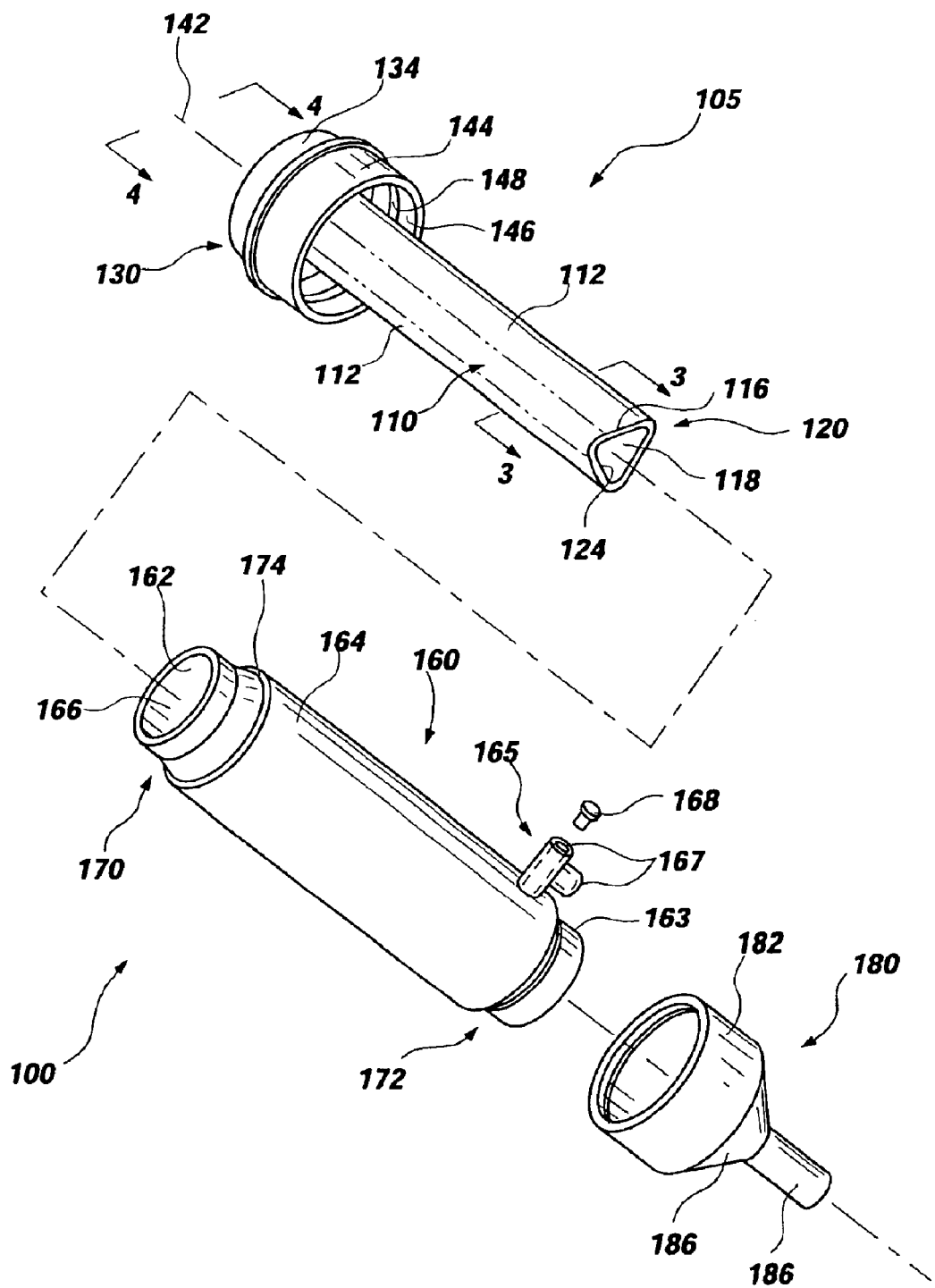
FIG. 1 is an exploded perspective view of a teat cup assembly before being assembled into a teat cup in one embodiment of the invention, note that the figure depicts the liner member, having an inflation portion and head portion, with the head portion farther away and the inflation portion closer, disposed at a perspective angle orthogonal to the perspective angle of the depiction of the sleeve and milk receiving cup.
Figure 2:
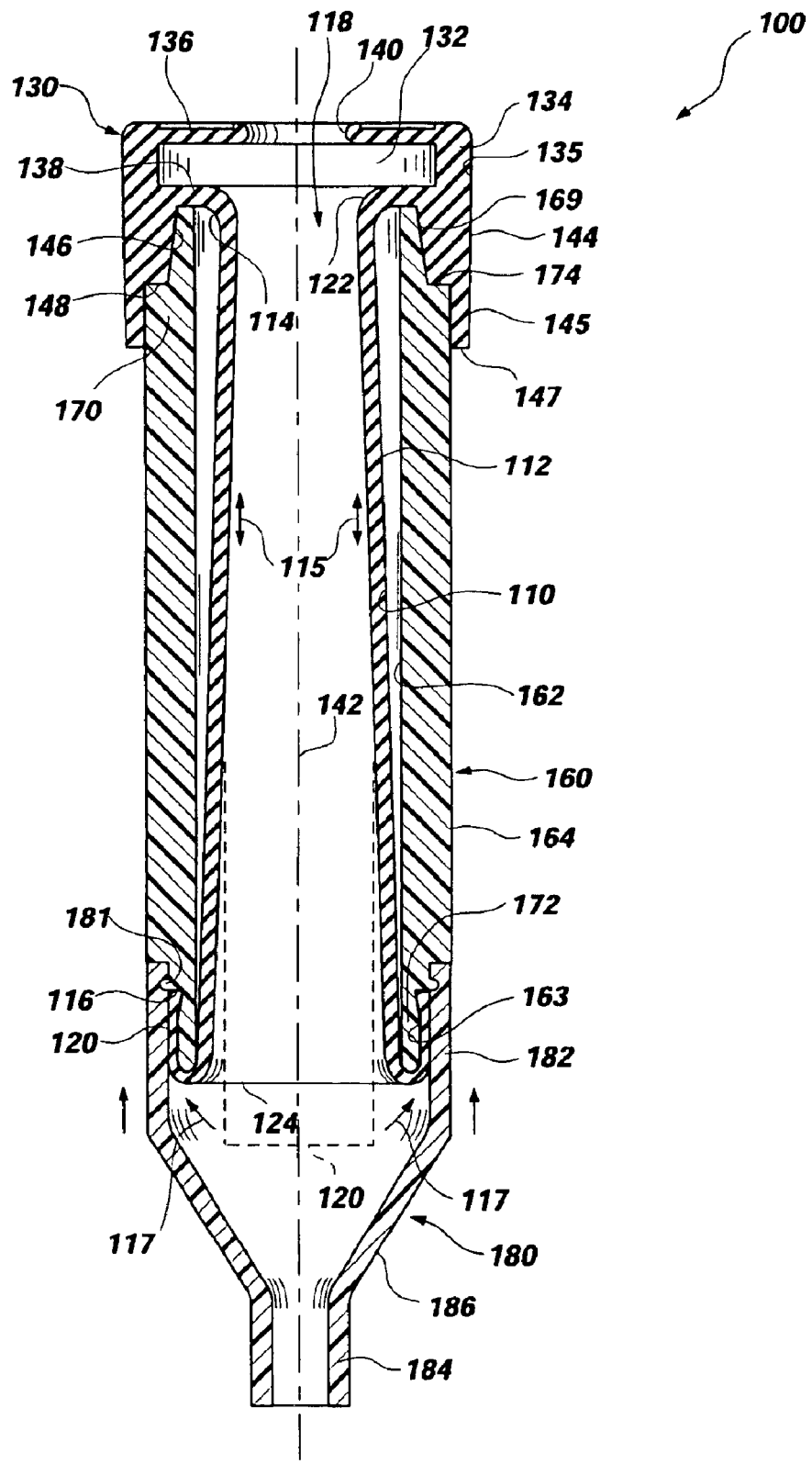
FIG. 2 is a cross-sectional view of an assembled teat cup in an embodiment of the invention, depicting the head portion drawn against an upper end portion of the sleeve and a free end of the inflation portion (shown in outline) being invertedly drawn around a lower end portion of the sleeve, with the milk receiving cup capturing the inverted free end against the lower end portion of the sleeve between the sleeve and milk receiving cup, arrows indicating the direction of movement of the end of the inflation portion and the milk receiving cup during assembly.

With reference to FIGS. 1 and 2, an example of a teat cup assembly 100 in accordance with principles of the invention is configured to draw milk from a cow's teat (not shown). Such a teat cup assembly can be utilized in cooperation with a vacuum-operated, automatic milking machine, as is known in the art.

In the illustrated embodiment, the teat cup assembly 100 can include essentially three primary components: a liner member 105, a tubular sleeve 160 and a milk receiving cup 180; the liner member 105 includes an inflation portion 110 and a head portion 130 formed as a unitary structure. Limiting the number of parts of the teat cup assembly to essentially three major components reduces the cost and time of manufacturing; as it enables the teat cup to be made from fewer parts and provides a simplified method of assembly. Further, limiting the number of components often results in less potential for faulty components and greater potential for a longer service life of the teat cup assembly. In the illustrated embodiment, a branched vacuum port 167 is used, and accordingly a plug 168 is also provided to plug an otherwise open audit end of the vacuum port. In another embodiment the vacuum port can be configured without a branch, in which case the plug can be eliminated.

The illustrated teat cup assembly 100 can be assembled by extending a free end 120 of the inflation portion 110 through the interior of the sleeve 160 so that a head portion 130 fits over an upper end portion 170 of the tubular sleeve 160. The inflation portion 110 can then be placed in tension along an axial direction 115, from an non-tensioned position (shown in outline), by invertedly drawing the free end 120 around an outer surface 163 of a lower end portion 172 of the tubular sleeve 160, as indicated by arrows 117. That is, the free end 120 of the inflation portion 110 is pulled downward and folded back around the outer surface 163 of the lower end portion 172 of the sleeve 160. The milk receiving cup 180 can then be axially aligned and slid over the inverted free end 120 of the inflation portion 110 to sandwich the inverted free end 120 between the cup and the lower end portion 172 of the sleeve 160. The milk receiving cup can be configured to mate with the sleeve and capture the lower, formerly free end of the inflation portion, and lock tight with an interference fit. With this arrangement, the tension placed on the inflation portion draws the head portion 130 against the upper end portion 170 of the sleeve 160 to provide an air-tight seal between the head portion 130 and the tubular sleeve 160. An adhesive, sealant, or combination thereof can be used to supplement the seal between the liner 105 and the sleeve 160 at the upper and/or lower portion of the sleeve in other embodiments.

The liner member 105 is formed of a resilient, flexible elastomeric material; which, it will be appreciated, facilitates functionality, and also assembly, of the teat cup. In one embodiment, the liner member can comprise a silicone material. Other elastomeric materials suitable for teat cup liner use, as will be familiar to one of ordinary skill in the art, can also be used. The liner member can be formed using a suitable molding technique.

The inflation portion 110 defines one or more wall(s) 112 extending axially along a length between a first end 114 and a second end 116. The inflation portion can include an elongated tubular shape with the walls 112 defining a bore 118 extending along the length between first and second open ends 122 and 124. The inflation portion 110 can have a substantially constant cross-section along the length of the inflation portion 110, wherein the constant cross-section is defined orthogonal to the longitudinal axis 142 of the inflation portion 110. As such, the walls defining the inflation portion can be substantially constant in their thickness (and width in the case of flattened portions as shown in the example illustrated) along the length of the inflation portion.

Further, the inflation portion 110 is of sufficient length to extend beyond the lower end portion 172 of the sleeve 160 when inserted therethrough, to allow sufficient length to invertedly draw the free end 120 over the lower end portion 172 of the sleeve 160. This allows the bottom portion to be turned inside out and stretched over the lower end portion. When the milk receiving cup 180 is subsequently slipped over the now-inverted bottom portion of the inflation portion it frictionally engages the bottom portion adjacent the free end and pulls it upward to abut with a stop portion 181 of the sleeve. This tensions the inflation portion and draws the head portion 130 more tightly against the upper portion 170 of the sleeve.

As can be appreciated with reference to FIG. 2 particularly, the sleeve portion 160 of the teat cup 100 can be made thick to provide increased weight to the teat cup, as is advantageous in teat cups as discussed above. In one embodiment, a metal filler can be combined with a polymeric resin used to make the sleeve portion to increase weight. In another embodiment, a weight, for example a stainless steel sleeve 183 (shown in outline), can be co-cast with the sleeve portion to provide increased weight.

Figure 3:
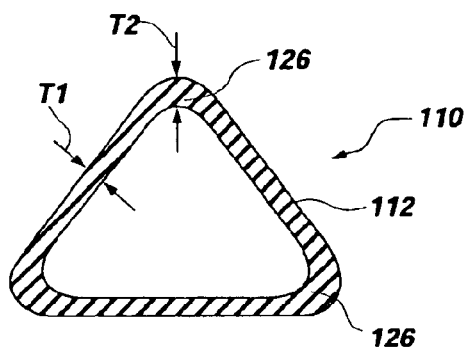
FIG. 3 is a cross-sectional view of the inflation portion in an embodiment of the invention, taken along line 3—3 in FIG. 1, depicting an inflation portion having a generally triangular configuration.

With reference to FIG. 3, the walls 112 of the inflation portion 110 can define an essentially triangular configuration, having rounded corner portions 126 having radii configured to reduce stress concentrations at the corners. The walls 112 and the radii portions 126 can be of a different thickness, and can comprise a first thickness T1 and second thickness T2, wherein the second thickness T2 is greater than the first thickness T1. With this arrangement, the walls 112 having the first thickness T1 readily collapse with the alternating suction force applied through the vacuum port 165 (FIG. 1) while the radii portions with the second thickness T2 provide a spring-back effect configured to readily spring the inflation portion 110 back to its original shape. Further, this arrangement can provide a longer service life for the inflation portion. That is to say, by thickening the radii portions of the triangular configuration, resistance to fatigue failure of the inflation portion is increased because stress concentration and crack propagation are mitigated to at least some extent by the increased thickness at the corner radii portions 126.

Figure 3A:
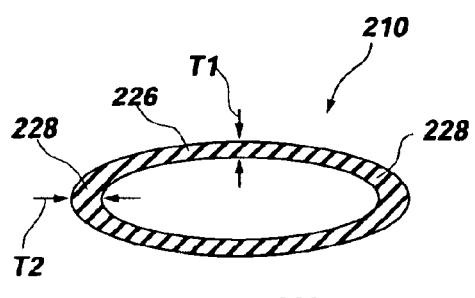
FIG. 3(a) is a cross-sectional view of an inflation portion in another embodiment of the invention, having a generally oval configuration.
Figure 3B:
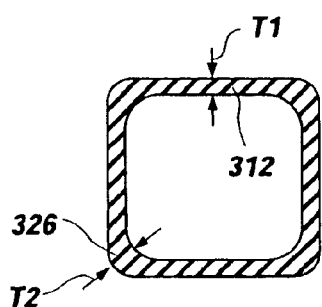
FIG. 3(b) is a cross-sectional view of an inflation portion in another embodiment of the invention, having a generally square configuration.

With reference to FIGS. 3(a) and 3(b), other configurations for the inflation portion 110 are possible in addition to circular. For example in one embodiment, the inflation portion cross section 210 can include walls defining an oval configuration. In this embodiment, the walls can define a first curved radii portion 226 and a second radii portion 228 with respective first and second thicknesses T1 and T2. As in the previous embodiment, the second thickness T2 can be thicker than the first thickness T1 to provide a spring-back effect to the walls collapsing due to the alternating suction applied to the inflation portion 210 and, further, provide a longer service life to the inflation portion 210.

In another embodiment shown in FIG. 3(b), an inflation portion cross section 310 has walls 312 defining a square configuration. Such walls 312 define curved radii portions 326 interconnecting adjacently positioned walls 312. The walls 312 and radii portions 326 define respective first and second thicknesses T1 and T2, with the second thickness T2 being thicker than the first thickness T1, thereby providing similar advantages in the inflation portion cross section in this example embodiment as that described previously in embodiments of the oval configuration and the triangular configuration. As can be will appreciated by one of ordinary skill in the art, the inflation portion can be formed with walls defining other configurations.

Referring again to FIGS. 1 and 2, the head portion 130 formed integrally with the first end 114 of the inflation portion 110 is generally cylindrical in shape; and, as previously set forth, is sized and configured to be fitted with and biased against the upper end portion 170 of the tubular sleeve 160. The head portion 130 includes an upper teat chamber 132 defined by a cylindrical wall 134, an upper diaphragm wall 136 and an intermediate wall 138.

The cylindrical wall 134 can define a side wall of the head portion 130 with an outer surface 135 defining an exposed outer surface of the head portion of the liner 105 of the teat cup assembly 100. The diaphragm wall 136 extends laterally inward from the cylindrical wall adjacent the top of the head portion and defines a central opening 140. The central opening 140 can be substantially circular and can be formed to coaxially coincide with a longitudinal axis 142 of the liner bore 118'. The central opening 140 is provided for initial reception of a cow's teat and, after insertion, provides a substantially sealing engagement of the teat, described in further detail below. The intermediate wall 138 can extend substantially orthogonally inward from the cylindrical wall 134 to form the lower wall of the upper teat chamber 132. Further, the intermediate wall 138 integrally interconnects to and extends transitionally in a curved configuration to the first end 114 of the inflation portion 110. That is, the intermediate wall 138 defines an opening therein, which is the first open end 122 of the inflation portion 110. As such, the liner member 105 provides free communication between the upper teat chamber 132 and the liner bore 118 to facilitate ready reception of the cow's teat through the central opening 140, through the upper teat chamber 132 and into the liner bore 118.

The head portion 110 also can include a cylindrical retaining extension 144 configured to extend substantially longitudinally downward from the cylindrical wall 134 of the head portion 130. Such a retaining extension 144 can include an inner surface 146 sized and configured to cooperate with and be positioned against the tubular sleeve 160 adjacent the upper end portion 170. The inner surface 146 of the retaining extension 144 can include a ledge 148 defined therein and configured to abut against a corresponding blocking edge 169 defined in the upper end portion 170 of the tubular sleeve. Further, the retaining extension 144 can include a cylindrical lip 145 defined on the free end 147 thereof configured to fit tightly around the tubular sleeve 160 below the blocking edge 169.

Figure 4:
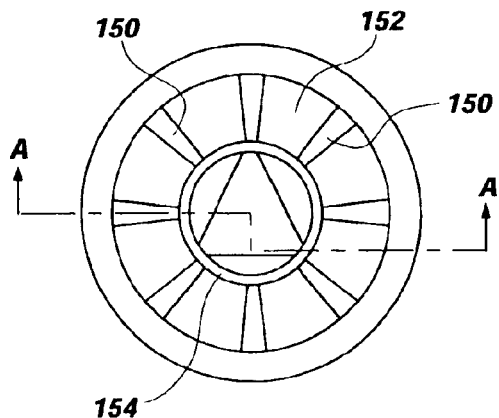
FIG. 4 is a top view of the liner member, taken along line 4—4 in FIG. 1, showing in more detail a spoke-like configuration of raised ribs in an exterior portion of an upper diaphragm wall of the head portion.
Figure 4A:
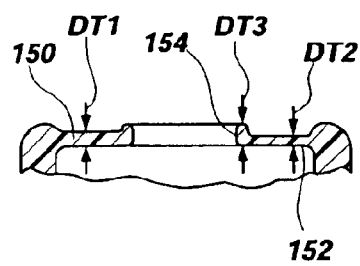
FIG. 4(a) is a partial cut-away cross-sectional view taken along line A—A in FIG. 4, showing essentially only an upper diaphragm wall for clarity, and depicting various thicknesses in the upper diaphragm wall of the head portion.

With respect to FIGS. 4 and 4(a), the diaphragm wall 136 of the head portion 130 can include a spoke configuration 150 defined in the exposed surface thereof surrounding the central opening 140. The spoke configuration 150 defines a first diaphragm thickness DT1 and portions 152 (without the spoke configuration) define a second diaphragm thickness DT2, wherein the first diaphragm thickness DT1 is greater than the second diaphragm thickness DT2. Further, the diaphragm wall 136 can include a ring portion 154 having a third diaphragm thickness DT3 defining the periphery of the central opening 140. The third diaphragm thickness DT3 can be greater than or equal to the second diaphragm thickness DT2. With this arrangement, the different thicknesses defined in the diaphragm wall 136 can add reinforcement to increase strength in the diaphragm wall 136 while also allowing improved flexibility to the wall over a solid configuration at the thicker wall thickness. These features facilitate the desirable characteristics for the upper diaphragm wall of the head portion discussed above. Further, the ring portion 154 defining the central opening 140 is sized and configured to provide firm contact with teats of various sizes, while also allowing for flexibility and comfort. Moreover, the configuration resists a tendency to move further up the teat during the milking period.

Referring back to FIGS. 1 and 2, the tubular sleeve 160 can include an inner and outer surface 162 and 164 defining a sleeve bore 166 between first and second open sleeve ends. In this embodiment, the tubular sleeve of the teat cup assembly 100 can be a single tubular sleeve with the outer surface 164 between the upper and lower end portions 170 and 172 configured to be an exposed surface of the teat cup assembly 100.

Such a tubular sleeve 160 can include the beforementioned upper end portion 170 and lower end portion 172 at opposing ends thereof. The upper end portion 170 is sized and configured to receive the head portion 130 of the liner member 105. Such an upper end portion 170 can include a blocking edge 174 to correspond with the ledge 148 defined in the retaining extension 144 of the head portion 130 to facilitate a sealing arrangement when the head portion 130 is drawn against the upper end portion 160. Further, the upper end portion 170 of the sleeve 160 can be sized and configured to provide an interference fit with the head portion 130, i.e. sized to slightly deform the head portion 130 radially outward to provide an improvement in sealing with the upper end portion 170.

Figure 5:
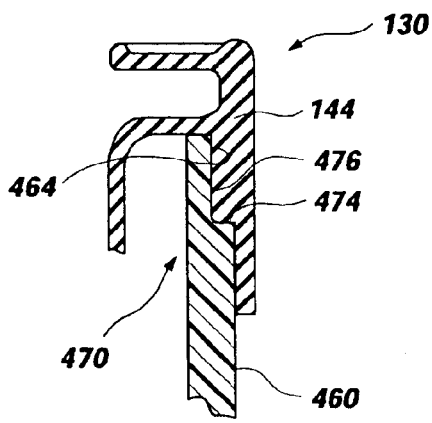
FIG. 5 is a partial cross-sectional view of an upper end of an assembled teat cup, particularly the head portion of the liner—inflation member and an upper portion of the sleeve, with the head portion providing a sealing fit with an upper end portion of the sleeve, in accordance with an embodiment of the invention.

FIG. 5 illustrates another embodiment of the upper end portion 470 having a beveled edge 476 extending to the blocking edge 474 each defined radially in the outer surface 464 of the upper end portion 470. Such a beveled edge 474 can further bulge the head portion radially outward to facilitate an air-tight sealing engagement between the retaining extension 144 of the head portion 130 biased against the upper end portion 470 of the sleeve 460. As can be well appreciated, the upper end portion can include other configurations to increase sealing between the head portion and the sleeve, as will be apparent to one of ordinary skill in the art.

With reference again to FIGS. 1 and 2, the lower end portion 172 of the sleeve 160 can be sized and configured to receive the free end 120 of the inflation portion 110 in an inverted manner, and to provide an interference fit with the milk receiving cup 180, as previously set forth. The lower end portion 172 can include a securing arrangement to provide a resistance to separation, cooperating with the inflation portion 110 intermediate the sleeve 160 and milk receiving cup 180. Such securing arrangement can be one of a number of suitable arrangements, such as a bead and groove arrangement, which will be described in further detail herein.

The tubular sleeve 160 also can include a vacuum port 165 defining a hole 167 extending through the tubular sleeve 160 to the inner surface 162 thereof. Such a vacuum port 165 can include a branched T-type configuration to provide one or more port holes 167, one of which can be plugged with a plug 168, as mentioned above.

The milk receiving cup 180 can include a tapering configuration. This can be, but is not limited to, a generally conical shape. Another suitable shape configured to receive and pass milk from the inflation portion 110 to a vacuum line configured to convey milk to a milk storage tank (not shown) can be used. The milk receiving cup 180 can include, but is not limited to, a cylindrical portion 182 and a tube portion 184 with a funnel portion 186 disposed therebetween. The cylindrical portion 182 can be sized and configured to correspond and fit around the lower end portion 172 of the sleeve 160 to capture the inverted free end 120 of the inflation portion 110 with an interference fit. The tube portion 184 can include a smaller diameter than the cylindrical portion 182 so that the funnel portion 186 includes walls that conically extend and taper from the cylindrical portion 182 toward the tube portion 184. The milk receiving cup 180 is configured to be operatively coupled to a suction source (not shown) at the tube portion or any suitable portion of the cup 180, to provide suction to the cow's teat and draw the milk through the teat cup assembly 100 to the milk tank. Such a milk receiving cup 180 can be formed from any suitable material, such as a rigid polymeric type material, or any other suitable material known in the art and can be formed using molding techniques as known in the art.

The milk receiving cup 180 can include a vacuum stabilizing vent 188, comprising a small opening defined by, the cup. This vent can be on the order of 0.018 to 024 diameter in size. This vent prevents the vacuum from spiking up to too high a value, and provides air flow through the collection line (not shown).

As is known, the milk collection cup 180 can be made of clear polymeric resin material to allow visualization of milk coming from the teat during milking, and to aid in cleaning the teat cup after milking operations. The clear material also allows inspection of the capture of the liner 105 at the free end 120 between the cup and the sleeve. It can be confirmed that the liner is drawn around and abuts the stop at the exterior of the bottom portion of the sleeve, and that the milk-collecting cup has been fully locked into place and that no cracking has occurred.

Figure 6A:
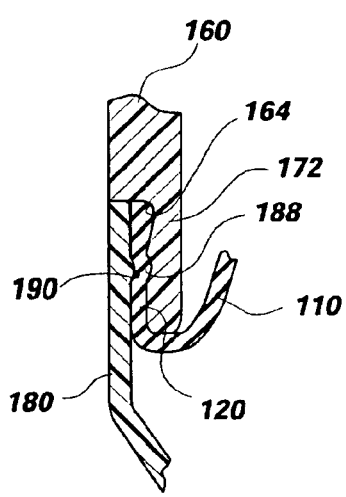
FIGS. 6, 6(a), 6(b), and 6(c) are partial cross-sectional views of various interference fittings in several example embodiments of assembled teat cups at a bottom portion of the sleeve, the inverted free end of the inflation portion being pulled back around and captured between the milk receiving cup and the lower end portion of the tubular sleeve.
Figure 6:
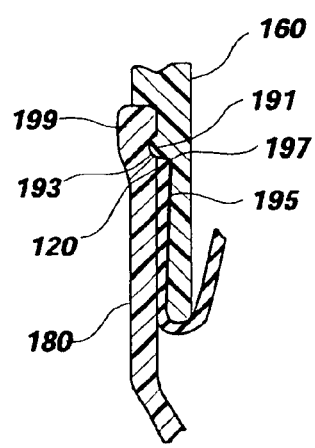
Figure 6B:
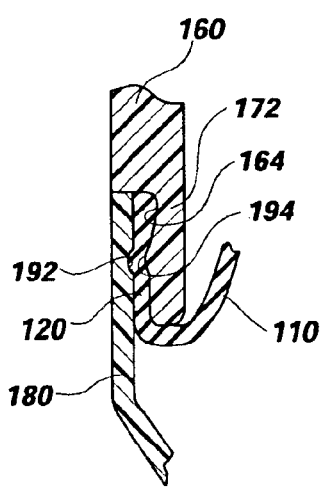
Figure 6C:
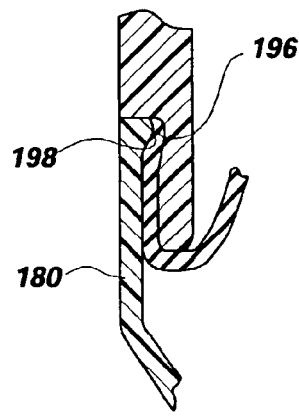

FIGS. 6, 6(a), 6(b), and 6(c) illustrate different examples of an interference fit locking configuration that can be provided between the lower end portion 172 of the sleeve 160 and the milk receiving cup 180 in different exemplary embodiments. With reference to FIG. 6, in one embodiment a lock between the milk receiving cup 180 and the sleeve 160 is effected by a bead 191 disposed annularly on the lower portion 172 of the sleeve and a corresponding groove 193 in the cup as before described. With reference to the Figure, it will be appreciated that a beveled portion 195 of the lower end portion of the sleeve is provided to acconin-iodate expansion of the inflation portion of the liner 105 adjacent its lower end 120. The inflation is pushed upward as the milk receiving cup is pushed over it, and the end 120 reaches a stop 197 intermediate the beveled portion and the bead. By elastic deformation of the milk receiving cup at a thickened portion 199 and elastic deformation of the sleeve at the location of the bead, the cup snaps into place and remains locked there by interference of the cup and sleeve requiring deformation to release the lock. The portion of the liner adjacent the lower free end 120 of the inflation portion 110 resists being drawn downward because it must further deform to do so. The beveled portion 195 thus cooperates with the milk receiving cup and the elastomeric nature of the liner to capture the liner and hold it in place.

Turning now to FIGS. 6(a,b and c), other examples of ways to effect a lock between the milk receiving cup 180 and the sleeve 160 are illustrated. In these examples deformation of the liner 105 inflation portion 110 adjacent an initially free end 120 provides a restoring force urging the lock to remain and resisting separation. Other ways of providing the connection are possible.

Figure 7:
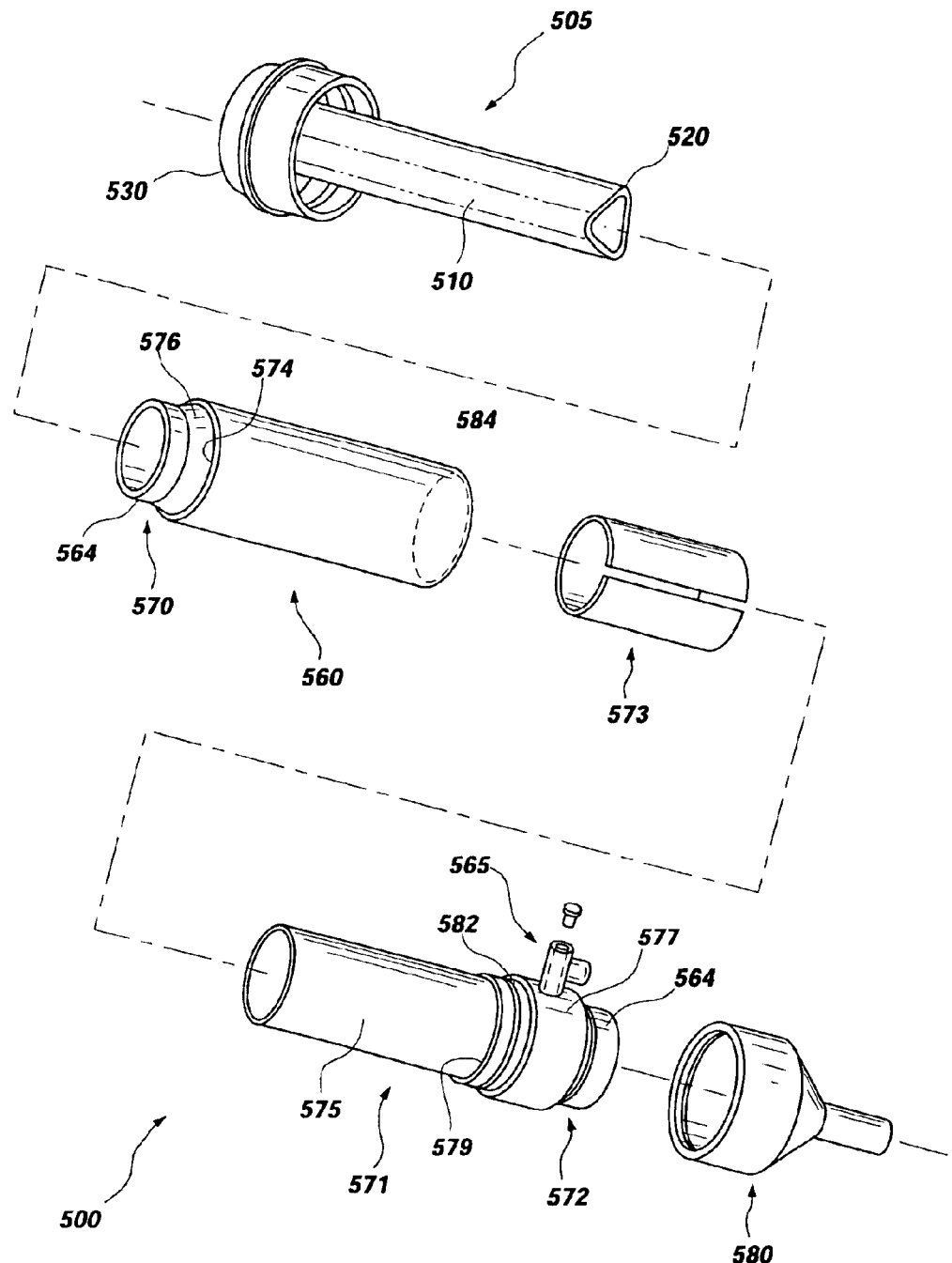
FIG. 7 is an exploded perspective view of a teat cup assembly in an embodiment in accordance with the invention, depicting a liner member (as in FIG. 1 viewed at an angle orthogonal to the viewing angle of a tubular sleeve and a milk receiving cup, the tubular sleeve in the illustrated embodiment including an upper (outer) tubular sleeve member, a lower (inner) tubular sleeve member and a sleeve-shaped weight disposed therebetween.

FIG. 7 illustrates another embodiment of a teat cup assembly 500. Similar to the previously discussed embodiments, the teat cup assembly includes a liner member 505 having an inflation portion 510 and head portion 530 and a milk receiving cup 580. However, in this embodiment, the tubular sleeve can include an upper tubular sleeve member 560 and a lower tubular sleeve member 571 with a weight comprising a metal sleeve 573 that can be positioned therebetween.

The upper tubular sleeve 560 can include an upper end portion 570 configured to receive the head portion 530. As such, the upper end portion 570 can include a blocking edge 574 and/or a beveled edge 576 defined annularly around an outer surface 564 of the upper end portion 570 of the upper tubular sleeve 560. The lower tubular sleeve 571 can include a sleeve portion 575 sized and configured to mate with the weighted sleeve 573. The lower tubular sleeve 571 can include a lower end portion 572 sized and configured to receive the free end 520 of the inflation portion 510 by invertedly drawing the free end 520 over the lower end portion 572 as previously discussed. The lower tubular sleeve 571 also can include the vacuum port 565 defined in an exposed lower portion 577 between the mating portion 575 and the lower end portion 572 of the lower tubular sleeve 571. A locking configuration comprising a raised bead 582 on the lower sleeve member and corresponding groove 584 in the upper sleeve member allows a snap-tight locking of the two sleeve members. An interference resists moving the bead out of the groove after locking the two portions of the sleeve together. The two sleeve portions thereafter act as a unit as a sleeve, weighted, and configured as described above.

Assembly of this embodiment can be employed by sliding the weighted sleeve 573 over the mating portion 575 of the lower tubular sleeve 571. The weighted sleeve 573 can be positioned against a ridge 579 defined at the lower end of the mating portion 575. The mating portion 575 can then be inserted through the lower open end of the upper tubular sleeve 560. The liner member 505 can then be inserted through the upper open end of the upper tubular sleeve 560 so that the head portion 530 is positioned over the upper end portion 570 and the free end 520 of the inflation portion 510 is exposed beyond the lower end portion 572 of the lower tubular sleeve 571. As in the previous embodiment, the inflation portion 510 can then be placed in tension by invertedly drawing the free end 520 around an outer surface 564 of the lower end portion 572 of the lower tubular sleeve 571. The milk receiving cup 580 can then be longitudinally mated over the inverted free end 520 of the inflation portion 510 to sandwich the inverted free end 520 against the lower end portion 572 of the tubular sleeve 560 with an interference fit. As such, the tension placed on the inflation portion 510 draws the head portion 530 against the upper end portion 570 of the upper tubular sleeve 560 to provide an airtight seal between the head portion 530 and the upper tubular sleeve 560.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A teat cup assembly, comprising:
    a tubular sleeve having an inner surface and an outer surface defining a sleeve bore between first and second open sleeve ends, the outer surface of the tubular sleeve defining an upper end portion and a lower end portion thereof;
    a milk receiving cup having a portion configured to be operatively coupled to the lower end portion of the tubular sleeve; and
    a liner member including:
        a head portion including an upper teat chamber defined with a cylindrical wall having an outer exposed surface, an intermediate wall extending substantially orthogonally inward from the cylindrical wall and an upper diaphragm wall laterally extending inward from the cylindrical wall having a central opening defined by the upper seal wall, the cylindrical wall of the head portion including a cylindrical retaining extension configured to cooperate with and be coupled to the upper end portion of the tubular sleeve; and
        a tubular elongate inflation portion including side walls with opposite first and second ends defining a liner bore longitudinally along a length of the tubular elongate inflation portion with opposite first and second open ends, the first end integrally interconnected and extending from the intermediate wall of the head portion with the first open end opening into the upper teat chamber, the second end of the tubular elongate inflation portion being a free end;

wherein the tubular elongate inflation portion is configured to be inserted through the sleeve bore so that the cylindrical retaining extension is disposed around the upper end portion of the tubular sleeves, the tubular elongate inflation portion configured to be placed in tension as the free end of the tubular elongate inflation portion is invertedly drawn around the lower end portion of the tubular sleeve with the portion of the milk receiving cup capturing the inverted free end between an outer surface of the lower end portion with an interference fit.

2. The teat cup assembly of claim 1, wherein the side walls of the tubular elongate inflation portion comprise at least three walls extending along the length of the inflation portion.

3. The teat cup assembly of claim 2, wherein the at least three walls include curved radial portions defined along the length of the inflation portion, the curved radial portions configured to interconnect adjacent side walls of the at least three walls.

4. The teat cup assembly of claim 3, wherein the side walls and the curved radial portions define a first thickness and a second thickness, respectively, the second thickness being larger than the first thickness.

5. The teat cup assembly of claim 1, wherein the tubular elongate inflation portion includes a substantially constant cross-section along the length of the inflation portion, the constant cross-section being defined orthogonal to the length of the tubular elongate inflation portion.

6. The teat cup assembly of claim 1, wherein the diaphragm wall comprises an upper surface defining a spoke configuration therein configured to provide reinforcement to the diaphragm wall.

7. The teat cup assembly of claim 1, wherein the head portion and the tubular elongate inflation portion each comprise an elastomeric material.

8. The teat cup assembly of claim 1, wherein the milk receiving cup comprises a substantially transparent polymeric material.

9. The teat cup assembly of claim 1, wherein the outer surface of the tubular sleeve between the upper and lower end portions is configured to be a substantially exposed surface of the tubular sleeve.

10. The teat cup assembly of claim 1, wherein the tubular sleeve includes a vacuum port defining a porthole therein extending through the inner surface of the tubular sleeve.

11. The teat cup assembly of claim 1, wherein the interference fit of the tubular elongate inflation portion is configured to maintain the head portion to the tubular sleeve with the tension placed on the tubular elongate portion.

12. The teat cut assembly of claim 1, wherein said upper diaphragm wall of said head assembly comprises a spoke configuration having a first and second diaphragm thickness and a ring portion having a third diaphragm thickness, wherein said thicknesses are selectively varied to increase the strength and flexibility in the upper diaphragm wall.

13. An improved teat cup assembly of the type including a tubular sleeve having an inner surface and an outer surface defining a sleeve bore between first and second open sleeve ends, the outer surface of the tubular sleeve defining an upper end portion and a lower end portion thereof, a milk receiving cup having a portion configured to be operatively coupled to the lower end portion of the tubular sleeve, and liner member with an end inverted around the lower end portion and retained there around and between the coupled milk receiving cup and the lower end of the tubular sleeve in an interference type fit, the improvement comprising:

a liner member including:
  a head portion including an upper teat chamber defined with a cylindrical wall having an outer exposed surface, an intermediate wall extending substantially orthogonally inward from the cylindrical wall and an upper seal wall laterally extending inward from the cylindrical wall having a central opening defined by the upper seal wall, the cylindrical wall of the head portion including a cylindrical retaining extension configured to cooperate with and be coupled to the upper end portion of the tubular sleeve; and
  a tubular elongate inflation portion including side walls with opposite first and second ends defining a liner bore longitudinally along a length of the tubular elongate inflation portion with opposite first and second open ends, the first end integrally interconnected and extending from the intermediate wall of the head portion with the first open end opening into the upper teat chamber, the second end of the tubular elongate inflation portion being a free end;
  wherein the tubular elongate inflation portion is configured to be inserted through the sleeve bore so that the cylindrical retaining extension is disposed around the upper end portion of the tubular sleeve with the inflation portion configured to be placed in tension with the free end of the tubular elongate portion invertedly drawn around the lower end portion of the tubular sleeve with the portion of the milk receiving cup capturing the inverted free end between an outer surface of the lower end portion with an interference fit.

14. A liner member configured to be used in a teat cup assembly including a tubular sleeve and a milk receiving cup, the liner member comprising:
  a head portion including an upper teat chamber defined with a cylindrical wall having an outer exposed surface, an intermediate wall extending substantially orthogonally inward from the cylindrical wall and an upper seal wall laterally extending inward from the cylindrical wall having a central opening defined by the upper seal wall, the cylindrical wall of the head portion including a cylindrical retaining extension configured to cooperate with and be coupled to an upper end portion of the tubular sleeve; and
  a tubular elongate inflation portion including side walls with opposite first and second ends defining a liner bore longitudinally along a length of the tubular elongate inflation portion with opposite first and second open ends, the first end integrally interconnected and extending from the intermediate wall of the head portion with the first open end opening into the upper teat chamber, the second end of the tubular elongate inflation portion being a free end;
  wherein the tubular elongate inflation portion is configured to be inserted through a sleeve bore defined in the tubular sleeve so that the cylindrical retaining extension is disposed around the upper end portion of the tubular sleeve with the tubular elongate inflation portion configured to be placed in tension with the free end of the tubular elongate inflation Portion invertedly drawn around a lower end portion of the tubular sleeve with a portion of the milk receiving cup capturing the inverted free end between an outer-surface of the lower end portion of the tubular sleeve with an interference fit.

15. The teat cup assembly of claim 14, wherein the side walls of the tubular elongate inflation portion comprise at least three walls extending along the length of the inflation portion.

16. The teat cup assembly of claim 15, wherein the at least three walls include curved portions defined along the length of the inflation portion, the curved portions configured to interconnect adjacent side walls.

17. The teat cup assembly of claim 16, wherein the side walls of the tubular elongate inflation portion define a first thickness and a second thickness, the second thickness larger than the first thickness, wherein the second thickness is defined at the curved portions.

18. The teat cup assembly of claim 14, wherein the tubular elongate inflation portion includes a substantially constant cross-section along the length of the inflation portion, the constant cross-section defined orthogonal to the length of the tubular elongate inflation portion.

19. A method of making a teat cup configured to draw milk from a teat of a cow in association with a vacuum pump of a milking machine providing cyclic suction thereto, the method comprising:

inserting a tubular elongate inflation liner, defining a liner bore along a length thereof, into a tubular sleeve so that an upper end portion of the tubular sleeve is disposed within a retaining portion of a head member, the head member integrally interconnected and extending to one end of the tubular elongate inflation liner so that the liner bore extends into an upper teat chamber defined in the head member by a head portion including an upper teat chamber defined with a cylindrical wall having an outer exposed surface, an intermediate wall extending substantially orthogonally inward from the cylindrical wall and an upper seal wall laterally extending inward from the cylindrical wall having a central opening defined by the upper seal wall, the cylindrical wall of the head portion including a cylindrical retaining extension configured to cooperate with and be coupled to the upper end portion of the tubular sleeve;

pulling a free end of the tubular elongate inflation liner, disposed in the tubular sleeve, to place tension on the tubular elongate inflation liner and invertedly draw the free end around a lower end portion of the tubular sleeve while simultaneously abutting the upper end portion of the tubular sleeve against the retaining portion of the head member with the tension placed on the tubular elongate inflation liner; and longitudinally sliding a milk receiving cup over the inverted free end of the tubular elongate inflation liner to capture the inverted free end against an outer surface of the lower end portion of the tubular sleeve with an interference fit.

20. The method of claim 19, further comprising maintaining the head portion abutted against the upper end portion of the tubular sleeve with the tension placed on the tubular elongate inflation liner and the interference fit of the inverted free end of the inflation portion.

21. The method of claim 19, further comprising forming the head portion and the tubular elongate inflation liner into a one-piece structure made from an elastomeric material.

\* \* \* \* \*